United States Patent
Schoor

(10) Patent No.: US 12,000,950 B2
(45) Date of Patent: Jun. 4, 2024

(54) ESTIMATION OF TRANSVERSE VELOCITIES OR CARTESIAN VELOCITIES OF POINT TARGETS WITH A RADAR SENSOR

(71) Applicant: Robert Bosch GmbH, Stuttgart (DE)

(72) Inventor: Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 888 days.

(21) Appl. No.: 16/962,178

(22) PCT Filed: Dec. 14, 2018

(86) PCT No.: PCT/EP2018/084915
§ 371 (c)(1),
(2) Date: Jul. 14, 2020

(87) PCT Pub. No.: WO2019/158253
PCT Pub. Date: Aug. 22, 2019

(65) Prior Publication Data
US 2020/0371199 A1    Nov. 26, 2020

(30) Foreign Application Priority Data
Feb. 15, 2018    (DE) .......................... 102018202293.3

(51) Int. Cl.
*G01S 7/295* (2006.01)
*G01S 13/44* (2006.01)
(Continued)

(52) U.S. Cl.
CPC .......... *G01S 7/295* (2013.01); *G01S 13/4445* (2013.01); *G01S 13/4454* (2013.01);
(Continued)

(58) Field of Classification Search
CPC .. G01S 7/295; G01S 13/4445; G01S 13/4454; G01S 13/584; G01S 13/589;
(Continued)

(56) References Cited

U.S. PATENT DOCUMENTS 10,866,306 B2 * 12/2020 Maher ..................... G01S 13/87
2009/0157314 A1    6/2009 Jordan et al.
(Continued)

FOREIGN PATENT DOCUMENTS

| CN | 103823217 A | 5/2014 |
| CN | 106461759 A | 2/2017 |

(Continued)

OTHER PUBLICATIONS

Radar Fundamentals.pdf from: https://faculty.nps.edu/jenn/seminars/radarfundamentals.pdf (Year: 2016).*
(Continued)

*Primary Examiner* — Peter M Bythrow
*Assistant Examiner* — Nazra Nur Waheed
(74) *Attorney, Agent, or Firm* — NORTON ROSE FULBRIGHT US LLP; Gerard A. Messina

(57) ABSTRACT

A method for estimating a speed of a radar target using a radar sensor, in particular a radar sensor for motor vehicles, on the basis of signals that are contained in respective evaluation channels that correspond to different center antenna positions of relevant transmitting and receiving
(Continued)

antennas in a direction, having the steps: determining, for the various evaluation channels, a respective individual radial speed assigned to the respective evaluation channel, of the radar target; and estimating a speed of the radar target based on the determined individual radial speeds of the radar target, the speed including information about a tangential speed; and a radar sensor for carrying out the method.

11 Claims, 3 Drawing Sheets

(51) Int. Cl.
G01S 13/58 (2006.01)
G01S 13/87 (2006.01)
G01S 13/931 (2020.01)
G01S 7/35 (2006.01)
G01S 13/34 (2006.01)

(52) U.S. Cl.
CPC .......... *G01S 13/584* (2013.01); *G01S 13/589* (2013.01); *G01S 13/878* (2013.01); *G01S 13/931* (2013.01); *G01S 7/356* (2021.05); *G01S 13/343* (2013.01)

(58) Field of Classification Search
CPC ...... G01S 13/878; G01S 13/931; G01S 7/356; G01S 13/343
See application file for complete search history.

(56) References Cited

U.S. PATENT DOCUMENTS

| | | | |
|---|---|---|---|
| 2014/0285375 A1* | 9/2014 | Crain | G01S 17/86 |
| | | | 342/25 A |
| 2019/0107614 A1* | 4/2019 | Dobrev | G01S 7/352 |
| 2022/0244349 A1* | 8/2022 | Wintermantel | G01S 7/35 |

FOREIGN PATENT DOCUMENTS

| | | |
|---|---|---|
| DE | 102012024998 A1 | 6/2014 |
| DE | 102013011239 A1 | 1/2015 |
| DE | 102013019804 A1 | 5/2015 |
| DE | 102014201026 A1 | 7/2015 |
| EP | 2068173 A1 | 6/2009 |
| JP | H1059120 A | 3/1998 |
| JP | H11271433 A | 10/1999 |
| JP | 2008286582 A | 11/2008 |
| JP | 2009041981 A | 2/2009 |
| JP | 2011526370 A | 10/2011 |
| WO | 2010000252 A2 | 1/2010 |
| WO | 2015197226 A1 | 12/2015 |

OTHER PUBLICATIONS

Dai, et al.: "MIMO-VSAR and a Kind of Optimized Array Configuration," Acta Electronica Sinica 12, (2008), pp. 1-6, with English Abstract.

* cited by examiner

ESTIMATION OF TRANSVERSE VELOCITIES OR CARTESIAN VELOCITIES OF POINT TARGETS WITH A RADAR SENSOR

FIELD

The present invention relates to a method for a radar sensor, in particular a radar sensor for motor vehicles, as well as to a radar sensor, in particular for motor vehicles.

BACKGROUND INFORMATION

Conventional radar sensors detect radar targets in polar coordinates. For example, a radial distance is measured, as is a radial relative speed, as well as angles in the azimuth and/or in the elevation. The determination of a transverse speed (or tangential speed) or angular speed can take place here only via an observed change in the angle over time, or using complex object models for extended radar objects.

Radar sensors are used in motor vehicles for example to measure distances, relative speeds, and azimuth angles of vehicles or other targets located in front of the home vehicle. A plurality of antennas are then configured for example at a distance from one another along a horizontal, so that different azimuth angles of the located radar targets result in differences in the run lengths that the radar signals must travel from the radar target to the respective antenna. These run length differences result in corresponding differences in the amplitude and phase of the signals that are received by the antennas and evaluated in the associated evaluation channels. For an angle estimation, the circumstance is exploited that the amplitude and phase relations of the signals obtained by the various receive antennas are functionally dependent, in a characteristic manner, on the angle of the radar target. By compensating the (complex) amplitudes received in the various channels with corresponding amplitudes in an antenna diagram, the angle of incidence of the radar signal, and thus the azimuth angle of the radar target, can then be determined. Correspondingly, the elevation angle of a radar target can also be estimated using antennas configured vertically one over the other.

SUMMARY

In accordance with the present invention, in the course of further increasing the performance of radar sensors, d, v estimations with increased resolution can take place. An increase in the usable sensor size, i.e., the size or aperture of the antenna system, will also enable an increase in the accuracy of the angular estimation and an improved angular separation. In an FMCW (frequency-modulated continuous wave) measurement method with linear frequency ramps and an evaluation of the receive signals using discrete Fourier transformation, in particular an FFT (Fast Fourier Transformation), the width of a distance bin of the Fourier transformation corresponds to a distance difference $\Delta r$, where $\Delta r=c/(2F)$, where c is the speed of light and F is the frequency shift of a linear frequency ramp of the FMCW transmit signal. This distance difference is also referred to herein as distance resolution.

The distance resolution is thus to be understood as the smallest distance difference at which (at the same relative speed) two measurement values of the distance from the radar sensor can still be mapped to separate bins, in the given operating mode of the radar sensor. When an FFT is carried out, the distance resolution corresponds to the distance between two distance bins in the FFT, i.e., the width of one distance bin. Here and in the following, the terms "distance resolution" and "width of the distance bin" are used synonymously. Differing from this, the "distance separability" is understood as twice the width of the distance bin. If the bandwidth of a radar sensor is increased, then, for example given a frequency shift of the transmit signal of F=2 GHz, a distance resolution of $\Delta r=7.5$ cm is possible. If at the same time the aperture or, in the case of a MIMO (Multiple Input Multiple Output) radar sensor, the virtual aperture is increased to values having a similar order of magnitude, then, depending on the angle of a radar target, the run length differences between receive signals of individual antennas or evaluation channels may already be so large that the Fourier spectra of the evaluation channels contain information about the amplitude and/or phase of the received signals, depending on the evaluation channel, not only in a frequency bin determined by the d, v estimation of an acquired radar target, but also in one or more adjacent frequency bins. Given a distance of 5 m to a radar target situated directly in front, and an offset between a middle and an outer antenna position of e.g., 40 mm, there results an angle difference of approximately 0.5°. If the radar target has a transverse speed of e.g., 2.7 m/s (10 km/h), then at the center antenna position no relative speed is seen, but at the outer antenna position a radial relative speed of 0.025 m/s, or, at the other side, −0.025 m/s, is seen. Given a bin size of the FFT of 0.1 m/s (speed resolution of the measurement), this corresponds to a frequency position shift of −¼ bin, 0 bin, or +¼ bin in the corresponding three evaluation channels.

An object of the present invention is to provide a method and a radar sensor with which a fast estimation of a tangential speed of a radar target is enabled.

According to the present invention, this object may be achieved by an example method for estimating a speed of a radar target using a radar sensor, in particular a radar sensor for motor vehicles, on the basis of signals that are obtained in respective evaluation channels that correspond to different center antenna positions of relevant transmitting and receiving antennas in a direction, having the steps: determining, for the different evaluation channels, a respective individual radial speed, assigned to the respective evaluation channel, of the radar target; and estimating a speed of the radar target based on the determined individual radial speeds of the radar target, the speed including information about a tangential speed. That is, the speed includes information indicating a tangential speed. The speed can be in particular a tangential speed, a transverse speed, or a Cartesian speed. A Cartesian speed is understood as a speed indicated in an orthogonal coordinate system. The Cartesian speed preferably includes a speed in the forward direction relative to the radar sensor and the tangential speed. In the case of a radar sensor oriented immediately in the forward direction, the tangential speed corresponds to the transverse speed.

This makes it possible to estimate the tangential speed of a radar target on the basis of a single measurement with a single transmit signal modulation cycle, in particular for example for a transmit signal having a frequency modulation pattern in the form of a frequency ramp or in the form of a rapid chirp sequence. In particular, the tangential speed can be estimated from respective frequency spectra based on a single measurement of the radial speed in the respective evaluation channels.

The measurement of the tangential speed or Cartesian speed can therefore take place very quickly. In particular, the measurement can be done directly for a single radar target, and on the basis of an acquisition of the radar target within a single modulation cycle or within a frequency ramp of the transmit signal. In this way, measurement of a tangential speed or Cartesian speed can be enabled even for targets that are visible only in one cycle, or in only a few cycles, and that are therefore difficult to handle using a complex object model, such as objects having rapid transverse movement, or construction at the edge of a roadway.

This enables a significantly faster reaction of a driver assistance system or a system for automated driving, in particular in the case of a radar target at a relatively small distance. This is particularly advantageous for protecting vulnerable road users (VRU), such as pedestrians.

A radar target is understood as a reflection center to which only a single position is assigned. The term "radar target" is used synonymously with "point target."

In the example method, a transmit signal of the radar sensor is transmitted by at least one antenna, and a signal is received by at least one antenna. In a useful specific embodiment, a transmitted signal is frequency-modulated with a ramp shape. In a useful specific embodiment, the radar sensor is an FMCW radar sensor.

Here and below, the estimated or determined variables that relate to the radar sensor as a whole are also referred to as "global" variables, while the variables relating to the respective evaluation channels and the relevant center antenna positions of transmitting and receiving antennas are referred to as "individual" variables. Thus, for example the tangential speed to be estimated may be referred to as the global tangential speed.

In addition, an object of the present invention may be achieved by an example radar sensor, in particular for motor vehicles, having an antenna system that has a plurality of antennas that are configured in various positions in a direction, and having a control and evaluation device that is designed to carry out the method.

Advantageous embodiments and developments of the present invention are described herein.

In a useful specific embodiment of the present invention, in the step of estimating a tangential speed, or a Cartesian speed, of the radar target, the tangential speed or Cartesian speed of the radar target is estimated based on the equation:

$$\begin{pmatrix} v_{r,1} \\ M \\ v_{r,i} \\ M \\ v_{r,l} \end{pmatrix} = \begin{pmatrix} \cos\theta_1 & \sin\theta_1 \\ M & M \\ \cos\theta_i & \sin\theta_i \\ M & M \\ \cos\theta_i & \sin\theta_i \end{pmatrix} \begin{pmatrix} v_x \\ v_y \end{pmatrix}, \quad (1)$$

where i=1, . . . , l designates respective evaluation channels, $v_{r,i}$ being the determined individual radial speeds of the radar target, $\theta_i$ being individual aspect angles, assigned to the respective evaluation channels, of the radar target, and ($v_x$, $v_y$) being the Cartesian speed of the radar target, $v_y$ being the tangential speed and $v_x$ being the speed of a radar target in the forward direction relative to the radar sensor.

In a useful specific embodiment, in the step of determining the respective individual radial speeds of the radar target for the respective evaluation channel, the respective individual radial speed is determined based on a respective frequency position of the signal in the evaluation channel.

In a useful specific embodiment of the present invention, a discrete frequency spectrum is calculated in the respective evaluation channels using Fourier transformation, and the respective frequency position of the signal in the relevant evaluation channel is determined with a resolution that is finer than the frequency distances of the support points of the discrete frequency spectrum. The resolution of the frequency position is here understood as a variable that indicates how finely graded the possible values of the frequency position are that are obtainable in the determination. The support points of the discrete frequency spectrum can also be referred to as frequency points or frequency bins.

The respective frequency position can be determined for example by interpolation of the frequency spectrum and searching for a peak maximum of the signal, or by fitting a frequency parameter of a model function to the signal in the frequency spectrum.

In the following, exemplary embodiments of the present invention are explained in more detail on the basis of the figures.

DETAILED DESCRIPTION OF EXAMPLE EMBODIMENTS

Figure 1:
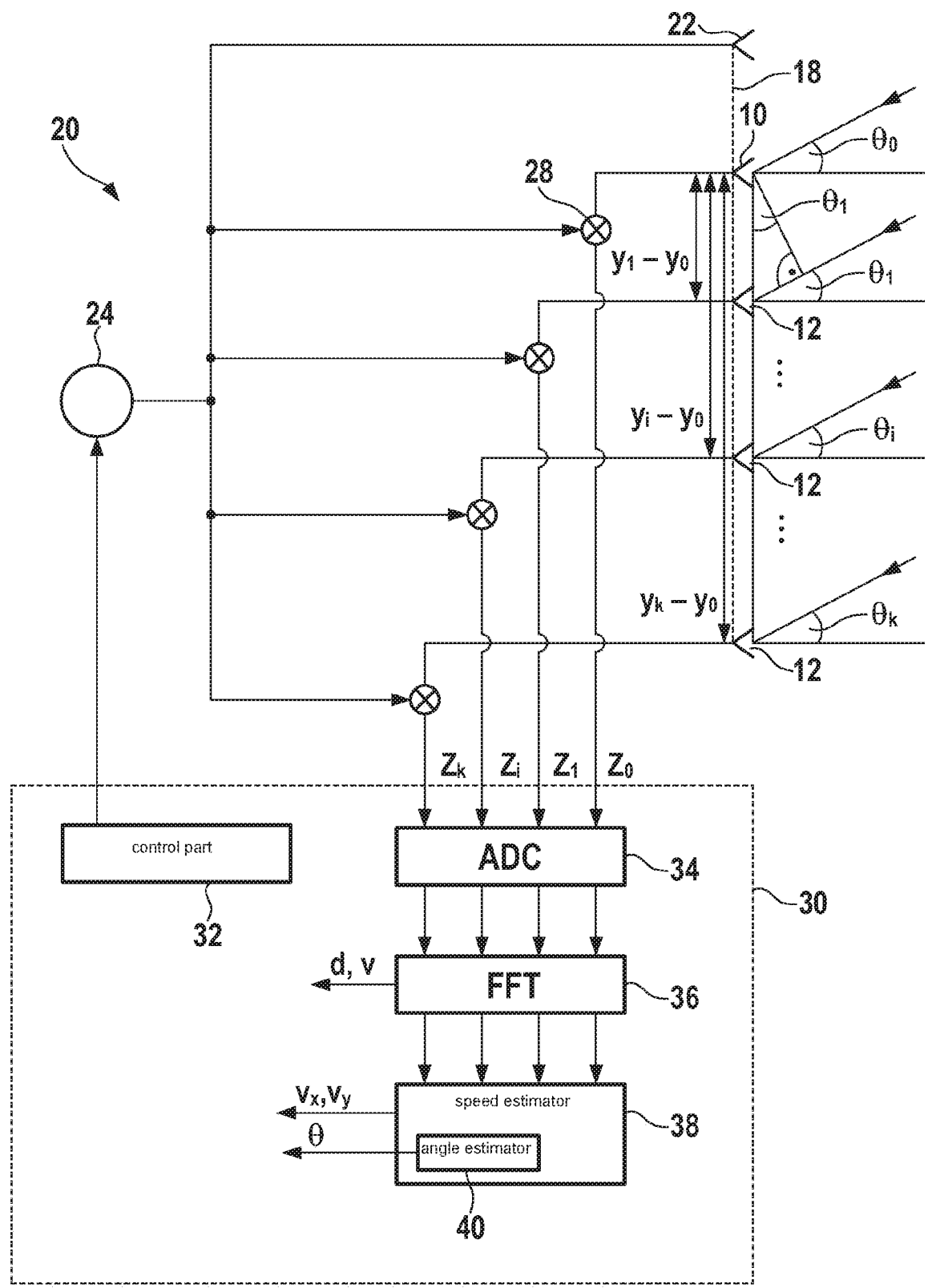
FIG. 1 shows a block diagram of a radar sensor according to an example embodiment of the present invention for motor vehicles.

The radar sensor shown in FIG. 1 has a plurality of receiving antennas or antenna elements 10, 12 on a common substrate 18. The radar sensor is installed in a motor vehicle in such a way that a plurality of the antennas 10, 12 are situated at the same height alongside one another at horizontal positions yi, i=0, . . . , k. In FIG. 1, radar beams are symbolically shown that are received by antennas at a respective azimuth angle θi (aspect angle).

A radio-frequency part 20 for controlling a transmitting antenna 22 includes a local oscillator 24 that produces the radar signal that is to be transmitted. The radar echoes received by antennas 10, 12 are each sent to a mixer 28 where they are mixed with the transmit signal supplied by oscillator 24. In this way, for each of the antennas 10, 12 a baseband signal or intermediate frequency signal Z0, Z1, . . . , Zi, . . . , Zk is obtained that is supplied to an electronic control and evaluation unit 30.

Control and evaluation unit 30 contains a control part 32 that controls the function of oscillator 24. In the example shown, the radar sensor is an FMCW radar unit, i.e., the frequency of the transmit signal supplied by oscillator 24 is periodically modulated in the form of a sequence of rising and/or falling frequency ramps.

In addition, control and evaluation device 30 contains an evaluation part having an analog/digital converter 34 having k channels, which digitizes the intermediate frequency signals Z0-Zk obtained by the k antennas 10, 12, and records each of them over the duration of a single frequency ramp. The time signals thus obtained are then converted channel by channel in a transformation stage 36 into corresponding frequency spectra, using fast Fourier transformation (FFT). In these frequency spectra, each radar target is recorded in the form of a peak whose frequency position is a function of the signal run time from the radar sensor to the radar target and back to the radar sensor, and, due to the Doppler effect, is a function of the relative speed of the radar target. From the frequency position of two peaks that have been obtained for the same radar target but on frequency ramps having different slope, for example a rising ramp and a falling ramp, the distance d and the relative speed v of the relevant radar target can then be calculated in a conventional manner. The estimated distance d can be designated the global distance of the radar target, differing from individual distances di assigned to the respective evaluation channels.

As FIG. 1 shows schematically on the basis of the radar beams, the different positions of antennas 10, 12 have the result that the radar beams emitted by one and the same antenna are reflected by the radar target and are then received by the various antennas, traveling different run lengths and therefore having phase differences that are a function of the azimuth angle θ of the radar target. The associated intermediate frequency signals Z0-Zk also have corresponding phase differences. The amplitudes (magnitudes) of the received signals also differ from antenna to antenna, also as a function of the azimuth angle θ.

On the basis of the signals in the frequency spectra of the evaluation channels, a speed estimator 38 estimates a Cartesian speed of the radar target having the components vx, the speed in the forward direction relative to the radar sensor, and vy, the tangential speed. This is explained in more detail below. In addition, an angle estimator 40 estimates an azimuth angle of the radar target on the basis of the signals.

Figure 2:
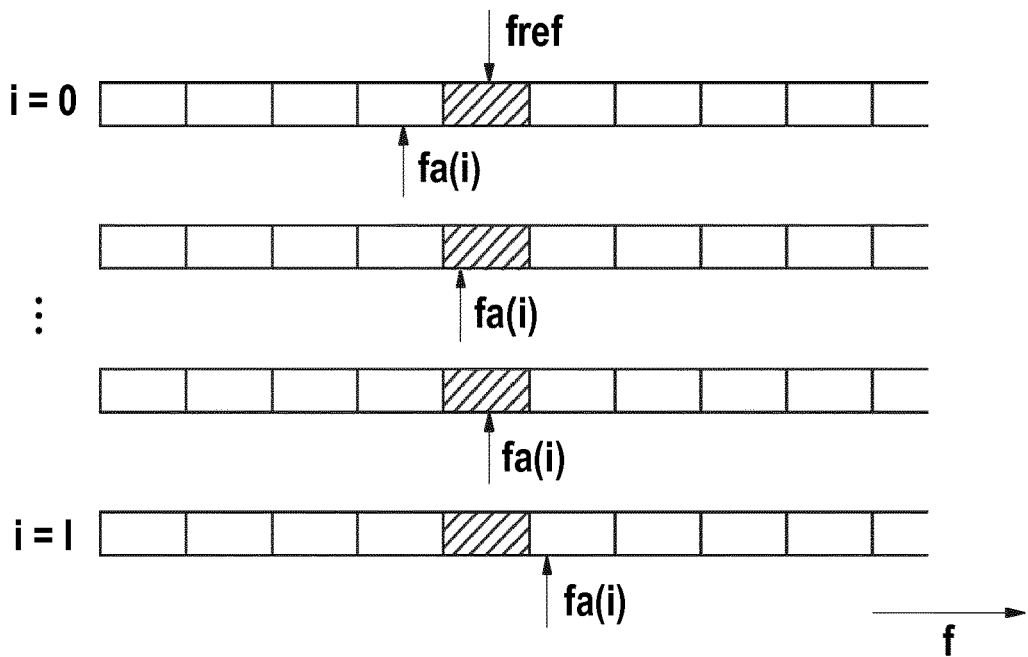
FIG. 2 shows a schematic representation of frequency bins of Fourier spectra of respective evaluation channels.

Given a high bandwidth, corresponding to a large frequency shift of the FMCW modulation, and a large extension of the antenna system, the complex amplitudes are contained in the individual frequency channels at different frequency positions fa(i) in the frequency spectrum of the received signal, depending on the azimuth angle θ of the radar target and depending on its distance d. FIG. 2 schematically illustrates the frequency positions fa(i) of the signals obtained for a radar target in evaluation channels i; here successive frequency bins of the Fourier spectrum are shown in the direction of increasing frequency f.

Figure 3:
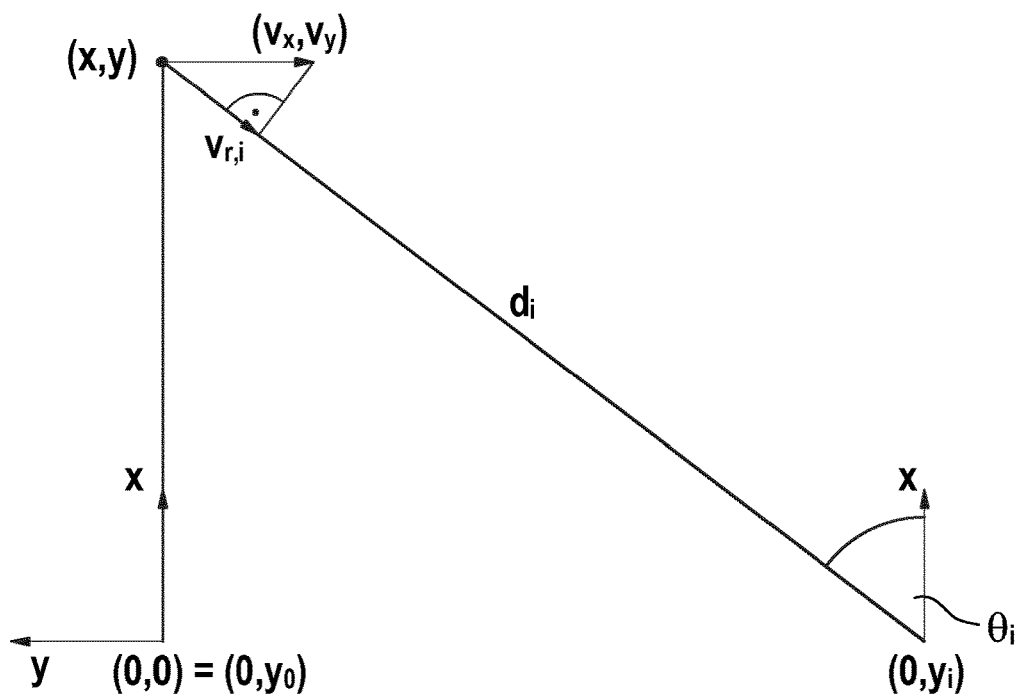
FIG. 3 shows a relation between an antenna position and a radar target.

FIG. 3 illustrates, in a top view of an antenna position of an evaluation channel, designated by index i at coordinates (0, yi), the relation to a point target as radar target at coordinates (x,y) having Cartesian speed (vx, vy). The distance of the point target is designated di, and the aspect angle of the received radar signal is designated θi. In order to simplify the representation, it is assumed that the origin (0,0) is the midpoint of the antenna array and corresponds to a center antenna position. In the example, vx=0, corresponding to a situation in which the point target is moving precisely in the transverse direction in front of the radar sensor. For simplicity, the Figure shows a situation in which the relative and absolute radial speed relative to the origin are equal to zero. At an antenna position (0, y0) at the origin, a radial speed vr, 0=0 is measured. At an antenna position (0, yi), a radial speed vr,i is measured.

This corresponds to the projection of the Cartesian speed (vx, vy) onto the radial direction of the antenna position, and is thus a function of the aspect angle θi of the radar target at the antenna position.

The relation between the aspect angles θi of the evaluation channels i, the Cartesian speed (vx, vy) of the point target, and the individual radial speeds, estimated in the respective evaluation channels i from the spectrum, is given by Equation (1). With a corresponding definition of the matrix M, this can be rewritten as:

$$\underline{v}_r = M \underline{V}_{xy}$$

From the individual radial speeds $v_{r,i}$ in the respective evaluation channels, the vector of the Cartesian speeds $\underline{v}_{xy}$ can then be estimated, using the method of least squares, as:

$$\hat{\underline{v}}_{xy} = (M^T M)^{-1} M^T \underline{v}_r \quad (2)$$

The greater the angle differences are, and the more accurately the relative speeds can be determined, the better the corresponding estimation. The least square estimation can be calculated numerically, for example using a pseudo-inverse, singular value decomposition (SVD), or a QR decomposition.

The distance di of the evaluation channels, "seen" on the basis of the run length differences by the radar sensor, is a function of the antenna configuration. Thus, in a bistatic system or an MIMO system, the effects (distance or run time) for the path from the transmit antenna to the target and from the target to the receive antenna are added and averaged. The distance di is thus the average distance of the path there and back over the average run time of the signal. A center antenna position of the transmit antenna and receive antenna is regarded correspondingly.

Figure 4:
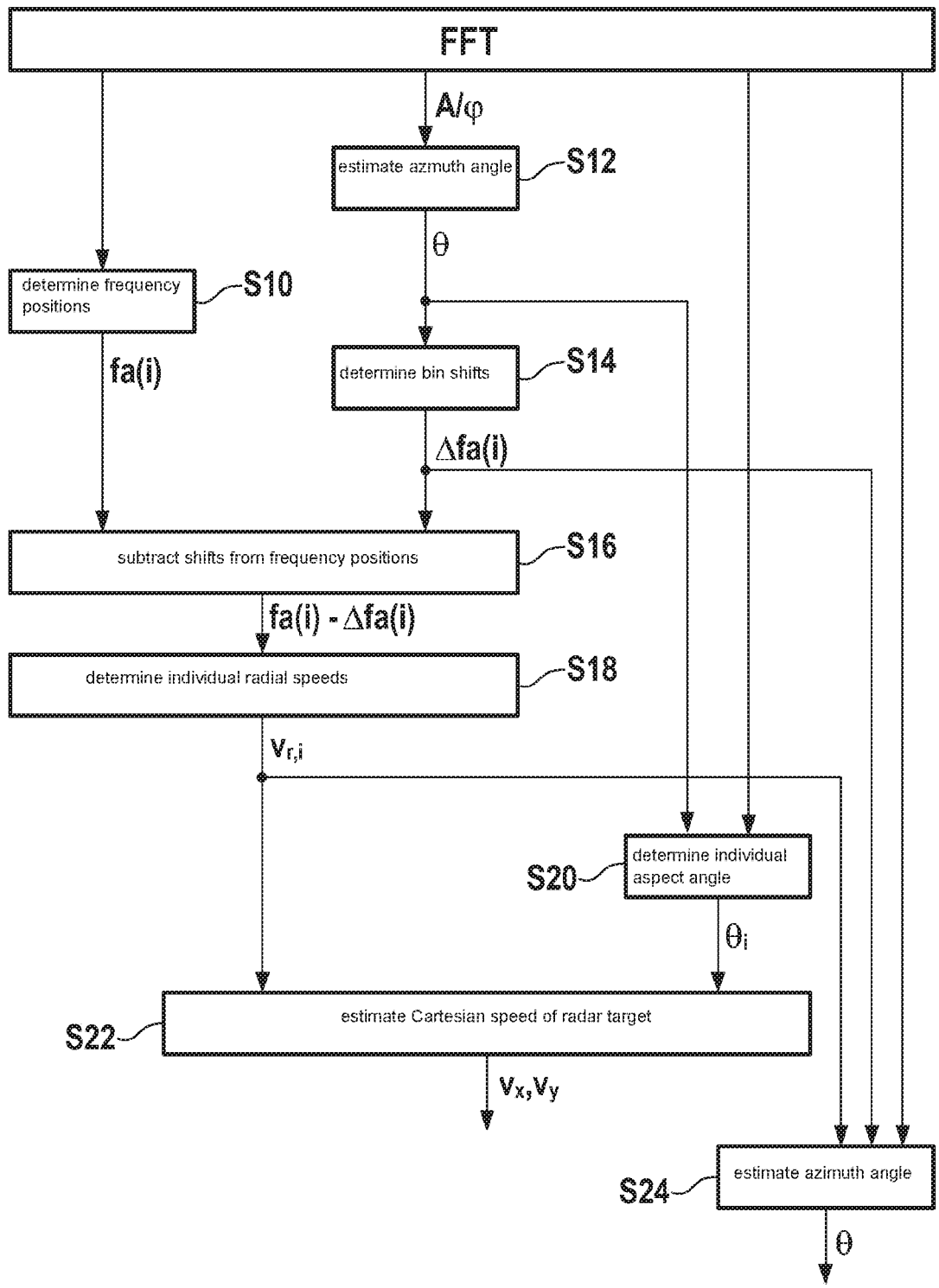
FIG. 4 shows a block diagram explaining an example method according to the present invention.

Control and evaluation device 30 is designed to carry out an example method in accordance with the present invention for estimating the Cartesian speed of the radar target as explained for example on the basis of FIG. 4 and implemented in speed estimator 38.

Through interpolation of the frequency spectra, in step S10 the frequency positions fa(i) of the signals (peak positions) of the channels i are determined with high resolution.

In a first angle estimation, in step S12, for each located object, i.e., each radar target (each peak in the frequency spectrum), the complex amplitudes obtained in the i received channels are compared with the antenna diagram in order to in this way estimate the azimuth angle θ of the radar target. Here, a vector of the complex amplitudes is evaluated at a respectively identical frequency position fref in each of the spectra of the channels. The estimated aspect angle θ can be designated a "global" aspect angle, in contrast to the individual aspect angles of the respective evaluation channels. From the azimuth angle θ and the antenna positions yi, in step S14 bin shifts resulting from distance (shifts Δfa(i) of the frequency position) of the channels are determined. The frequency position shifts can be referred to as frequency position shifts resulting from distance. The frequency position shifts can also be designated frequency position corrections. As explained above, they are the result of a high distance resolution of the measurement. The frequency position shift occurs as a function of the aspect angle. It may also be zero, depending on the aspect angle.

In step S16, the shifts Δfa(i) are subtracted from the frequency positions fa(i), and the remaining frequency positions fa(i)-Δfa(i) are evaluated in step S18 in order to determine therefrom the individual radial speeds vr,i of the channels i. This is done according to the FMCW equation $$k = \frac{2}{c}(dF + f_0 v_r T).$$

Here k is a bin position corresponding to the remaining frequency position, c is the speed of light, d is the distance, F is the frequency shift of the ramp, f0 is the center frequency, vr is the radial speed, and T is the duration of the ramp. The evaluated frequency position is the frequency position that remains taking into account the frequency position shift.

In step S20, the individual aspect angle θi is determined from the global distance d and the estimated azimuth angle θ, for example taking into account the antenna positions yi, for example based on geometrical relationships of these variables. The individual aspect angles can also be calculated for example from Cartesian coordinates of the radar target and from the center antenna positions.

In step S22, the estimation takes place of the Cartesian speed of the radar target on the basis of Equations (1) and (2). For an output of the radar sensor, these can be transformed for example into a radial speed and tangential speed (or angular speed) relative to the origin.

In an optional step S24, in a second, improved angle estimation, angle estimator 40 estimates azimuth angle θ, a vector of the complex amplitudes being evaluated at respective frequency positions in the respective spectra of the channels taking into account the frequency shifts Δfa(i) and/or corresponding speed-dependent frequency shifts Δfb(i) resulting from azimuth angle θ and antenna positions yi. In particular, this is a step of the second estimation of the aspect angle of the radar target, which is carried out in addition to the above-described (first) step S12 of estimating the aspect angle.

The example method can in particular be an iterative method in which, based on the second estimation of the aspect angle, the steps S14, S16, S18, S20, S22, which are a function of the estimation of the aspect angle, are carried out again.

As can be seen from the diagram, steps can be executed parallel to one another or in a different sequence.

In a useful specific embodiment of the present invention, differences in the individual radial speeds are taken into account if the distance of the radar target is below a distance threshold value. This is because, given very large distances, the effects are too small to be able to distinguish individual radial speeds. The distance threshold value can be selected on the basis of test measurements or based on a theoretical speed resolution of the radar sensor.

In the exemplary embodiments described here, a bistatic antenna design is used. Optionally, however, a monostatic antenna design could also be used in which the same (group) antennas are used for transmission and for reception.

The described example method according to the present invention can advantageously be used in particular in FMCW radar sensors that operate with so-called rapid chirp sequences. Here, a multiplicity of frequency ramps (chirps) that have a large slope and a relatively short duration are gone through in a rapid sequence. The 2D FFT carried out over the individual ramps and over the sequence of the ramps results in a two-dimensional frequency spectrum per evaluation channel i. Correspondingly, the frequency positions fa(i), as well as the frequency shifts Δfa(i) or Δfb(i), are then, in the general case, two-dimensional vectors.

What is claimed is:

1. A method for estimating an actual speed of a radar target using a radar sensor for a motor vehicle on the basis of a plurality of signals that are obtained from different respective ones of a plurality of receiving antennas arranged at different positions than one another on a same substrate of the radar sensor so that respective center positions, which are all measured in a single direction between (i) each respective one of the plurality of receiving antennas and (ii) a same transmitting antenna that is also arranged on the substrate, all differ from one another, the method comprising the following steps:

for a single transmission modulation cycle of a signal transmission by the same transmitting antenna:
obtaining, by each of the plurality of receiving antennas, different respective echo signals generated by a reflection, from the radar target, of the signal transmission, the differences between the respective echo signals being a function of the differences in the respective center positions of the plurality of receiving antennas;
due to differences in the respective echo signals determining a plurality of different values of a radial speed of the radar target without obtaining corresponding values of a tangential speed, each of the plurality of different values of the radial speed being determined based on a different respective one of the obtained echo signals; and
estimating the actual speed of the radar target based on a combination of the determined plurality of different values of the radial speed of the radar target determined for the single transmission modulation cycle without use of any radial speeds determined in any other transmission modulation cycle, the estimated actual speed including an estimated tangential speed of the radar target relative to the radar sensor.

2. The method as recited in claim 1, wherein in the estimated actual speed of the radar target further includes an estimated speed of the radar target in a forward direction relative to the radar sensor.

3. The method as recited in claim 1, wherein the estimated actual speed of the radar target is estimated as a Cartesian speed of the radar target.

4. The method as recited in claim 1, further comprising the following step:
determining, for each of the respective receiving antennas, a respective individual aspect angle of the radar target relative to the respective receiving antenna, wherein the estimating of the actual speed of the radar target is further based on a combination of the determined individual aspect angles.

5. The method as recited in claim 4, wherein the determination of the respective individual aspect angles is based on an estimated aspect angle of the radar target and an estimated distance of the radar target, taking into account the respective center antenna position of the respective receiving antenna.

6. The method as recited in claim 1, wherein the determination of the plurality of different values of the radial speed of the radar target is based on different respective frequency positions of different ones of the echo signals.

7. The method as recited in claim 6, wherein the different respective frequency positions are each formed by modifying a respective original frequency position based on a respective frequency shift for the respective receiving antenna, the respective frequency shift for the respective receiving antenna corresponding to a distance difference of the radar target to the respective center position of the respective receiving antenna.

8. The method as recited in claim 7, further comprising the following steps:
estimating an aspect angle of the radar target based on amplitude and/or phase relations between the echo signals of different ones of the receiving antennas that arise due to the different respective center antenna positions of the receiving antennas; and
determining respective frequency position shifts of the echo signals of the respective receiving antennas, the frequency position shifts corresponding to distance differences of the radar target to the respective center antenna positions as a function of the estimated aspect angle;

wherein the determination of the respective values of the radial speed is based on respective frequency positions of the echo signals determined taking into account respective ones of the determined frequency position shifts.

9. The method as recited in claim 1, further comprising the following step:

estimating an aspect angle of the radar target based on amplitude and/or phase relations between the echo signals of different ones of the receiving antennas that arise due to the different respective center antenna positions of the receiving antennas, wherein the echo signals of the respective receiving antennas are evaluated at respective frequency positions:

(i) taking into account respective first frequency position shifts of the echo signals, the first frequency position shifts corresponding to distance differences of the radar target to the respective center antenna positions of the respective receiving antennas, and/or (ii) taking into account respective second frequency position shifts of the echo signals, the second frequency position shifts corresponding to differences in the determined values of the radial speed of the radar target determined for different ones of the receiving antennas.

10. The method as recited in claim 1, wherein each of the echo signals of all of the plurality of receiving signals is mixed with a same signal of the same transmitting antenna.

11. A radar sensor for a motor vehicle, comprising:

an antenna system having a transmitting antenna and a plurality of receiving antennas arranged at different positions than one another on a same substrate so that respective center positions, which are all measured in a single direction between (i) each respective one of the plurality of receiving antennas and (ii) the transmitting antenna, all differ from one another, the transmitting antenna being a same transmitting antenna at different distances from which different ones of the receiving antennas are arranged; and a processor, wherein the processor is configured to, for a single transmission modulation cycle of a signal transmission by the same transmitting antenna:

obtain, by each of the plurality of receiving antennas, different respective echo signals generated by a reflection, from the radar target, of the signal transmission, the differences between the respective echo signals being a function of the differences in the respective center positions of the plurality of receiving antennas;

due to differences in the respective echo signals determine a plurality of different values of a radial speed of the radar target without obtaining corresponding values of a tangential speed, each of the plurality of different values of the radial speed being determined based on a different respective one of the obtained echo signals; and estimate the actual speed of the radar target based on a combination of the determined plurality of different values of the radial speed of the radar target determined for the single transmission modulation cycle without use of any radial speeds determined in any other transmission modulation cycle, the estimated actual speed including an estimated tangential speed of the radar target relative to the radar sensor.

\* \* \* \* \*